Dec. 13, 1932. R. E. DANIEL ET AL 1,890,498

RUNWAY FOR PIPES

Filed June 2, 1931 2 Sheets-Sheet 1

WITNESS:
Robt R Kitchel

INVENTORS
Robert Earl Daniel,
Richard K. Haughton and
Stuart B Clark
BY Francis T Chaney
ATTORNEY.

Dec. 13, 1932.   R. E. DANIEL ET AL   1,890,498
RUNWAY FOR PIPES
Filed June 2, 1931   2 Sheets-Sheet 2

INVENTORS
Robert Earl Daniel,
Richard K. Haughton and
Stuart B. Clark
BY
Francis J. Clauder

ATTORNEY.

WITNESS:

Patented Dec. 13, 1932

1,890,498

UNITED STATES PATENT OFFICE

ROBERT EARL DANIEL AND RICHARD K. HAUGHTON, OF BIRMINGHAM, ALABAMA, AND STUART B. CLARK, OF RIVERTON, NEW JERSEY, ASSIGNORS TO UNITED STATES PIPE AND FOUNDRY COMPANY, OF BURLINGTON, NEW JERSEY, A CORPORATION OF NEW JERSEY

RUNWAY FOR PIPES

Application filed June 2, 1931. Serial No. 541,650.

Our invention relates to runways for pipes and particularly, though not exclusively, to runways used in connection with centrifugal pipe casting machines in which the bed or frame of the machine is made tiltable so as to adjust at will the inclination of the mold and other parts of the machine supported on the tiltable frame. One object of our invention is to provide such a centrifugal casting machine with runways or skids adapted to receive the cast pipes and which runways will be so permanently connected with the tiltable frame of the machine as to maintain the runways or skids in proper alignment with the machine. Another object of our invention is to provide a runway for pipes having a plurality of pipe supporting tracks so supported that they will automatically adjust themselves under the weight of a supported pipe and maintain contact with the pipe. Centrifugally cast pipes are removed from the molds in which they are cast as soon as the metal has set and are shifted away from the machine to make room for a new casting as rapidly as possible and particularly in the case of long pipes it is found desirable to supply in the runways or skids to which the pipes are removed more than two lines of supporting rails or ledges spaced from each other so as to provide for the support of the hot pipe at a number of points along its length. Owing to the fact however that the pipes are not always perfectly circular in section and not always perfectly straight, it is found that where more than two fixed rails or ledges are provided all of such rails or ledges are not continuously in contact with the pipe and this lack of support is liable to subject the pipe to undesirable bending strains, which may even result in changing its form, and a leading feature of our invention consists in locating the pipe supporting rails or ledges on pivoted frames, the tracks being located on opposite sides of lines of pivotal supports, so that under the weight of a supported pipe, the frames will automatically adjust themselves to keep both lines of tracks in contact with the pipe. By preference, at least two such tilting platforms are employed so as to afford four lines of tracks and, in case the runways are intended to support very long pipes, our invention makes it practicable to provide additional tracks, all of which will be maintained in contact with the pipes.

Our invention will be best understood as described in connection with the drawings, which illustrate a machine provided with our improvements, and in which Figure 1 is a diagrammatic side elevation of a centrifugal casting machine provided with our improvements.

Figure 4:
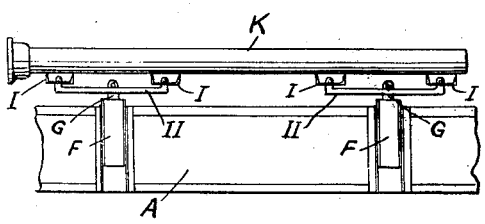

Figure 4 diagrammatically illustrates a modification providing for the support of a pipe on a multiple number of self adjusting skids.

Figure 5:
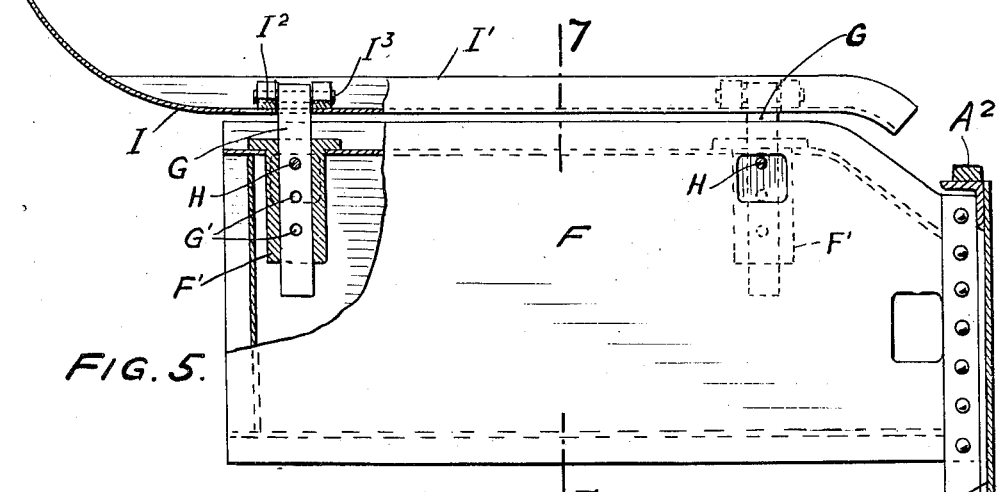

Figure 5 is a top view of one of the self adjusting platforms or forms partly broken away to show the top of the guideway for a supporting post.

Figure 6:
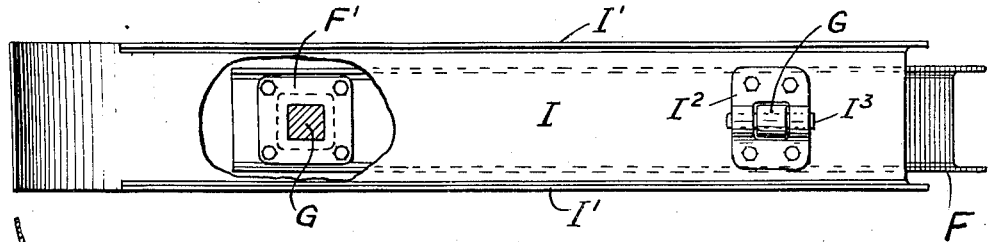
Figure 7:
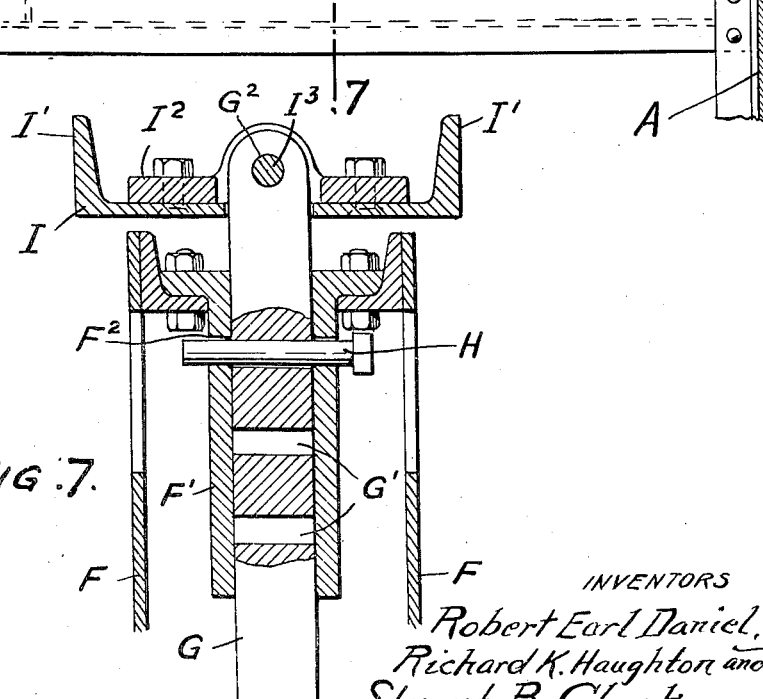

Figure 6 is a detailed view showing the laterally extending supporting frame in which the post supporting the tilting frame is adjustable, showing also the pivotal connection between the tilting frame and the post, and Figure 7 is an enlarged detailed view showing the construction of the guideway for the post and the connections between the post and the tilting frame.

A indicates the supporting frame of a centrifugal casting machine which is pivotally supported on trunnions, indicated at B, and angularly adjustable by means of a jack, indicated at C. The tilting frame is secured in any desired angle of inclination in any convenient way, as shown, by means of rods $C^1$ secured to the head $C^2$ of the jack and passing through lugs $C^3$ to which the rods are secured by means of nuts, indicated at $C^4$ and $C^5$. Supported on the upper end of the frame A are uprights $A^1$ which support a pouring ladle indicated at D and also supported on this end of the frame is a runner trough D¹. A² A² indicate tracks supported on the top of the frame A and supporting in turn a carriage E, which carriage supports a water box, a rotatable centrifugal mold and mechanism for rotating the mold, all substantially as shown in the patent to J. H. Uhrig, 1,746,374, granted February 11, 1930. It will be understood that mechanism is also provided for reciprocating the carriage on the tracks A², as shown, for instance, in the patent to Uhrig 1,746,374 and that gripping mechanism for engaging the inside of the bell end of a cast pipe and operating to assist in drawing the casting from the mold is also provided as shown in the patents to Ladd, No. 1,499,621, of July 1, 1924; 1,723,792, of August 6, 1929, and 1,726,672, of August 3, 1929. Firmly secured to one side of the frame A are skid supporting frames or brackets indicated at F, each of which, as shown, supports two vertical guideways indicated at F¹, in which are vertically adjustable posts indicated at G, which posts are provided with spaced perforations G¹ which can be brought to register with perforations F² in the guideways and the post having been brought to the desired height is secured in place by a pin H extending through the registering perforations. The upper end of the post is provided with a pin hole G². I, I are tilting frames provided with upwardly extending flanges or tracks indicated at I¹ at their edges and pivotally supported on the posts G, as shown by means of saddle pieces I² secured to the upper portions of the plate I through which and the perforation G² at the top of the post extend pivot pins indicated at I³.

The apparatus particularly indicated is of the general type of the apparatus described in the Ladd Patent No. 1,726,672 of August 3, 1929. In apparatus of this kind the operation of casting pipe begins when the carriage and mold are shifted to a position in which the runner or pouring trough extends through the mold to the bell end and, after the metal begins to run into the mold, the mold is drawn away so that the metal runs out of the runner, progressively contacting with new portions of the mold until the mold is passed beyond the end of the runner and the casting is complete. The mold is then shifted in a reverse direction carrying the casting within it. The core supports over the bell end are removed and the mold then again moved back to its outermost position, in which position a gripper is inserted into the bell end of the pipe, expanded to engage the pipe, and the mold then retracted while the pipe is held stationary by the gripper so that when the mold is fully retracted the pipe is entirely removed from it.

Figure 1:
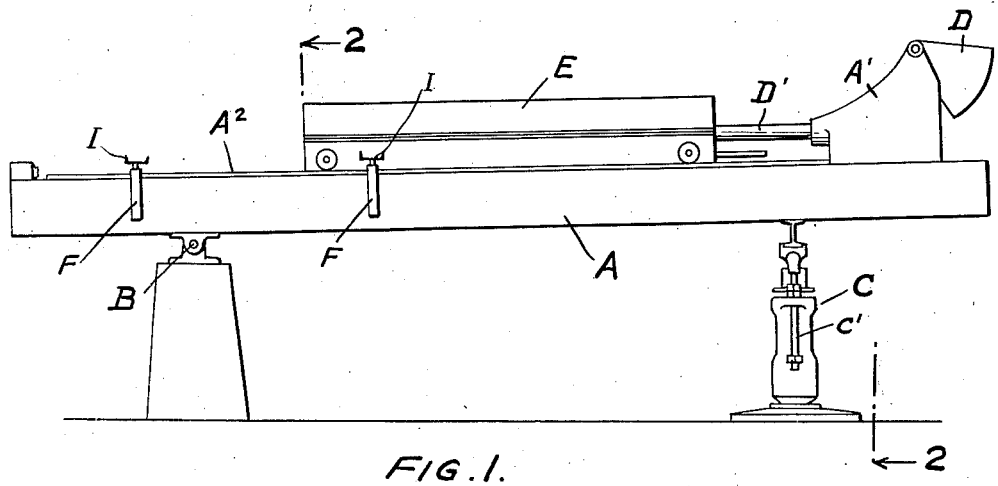
Figure 2:
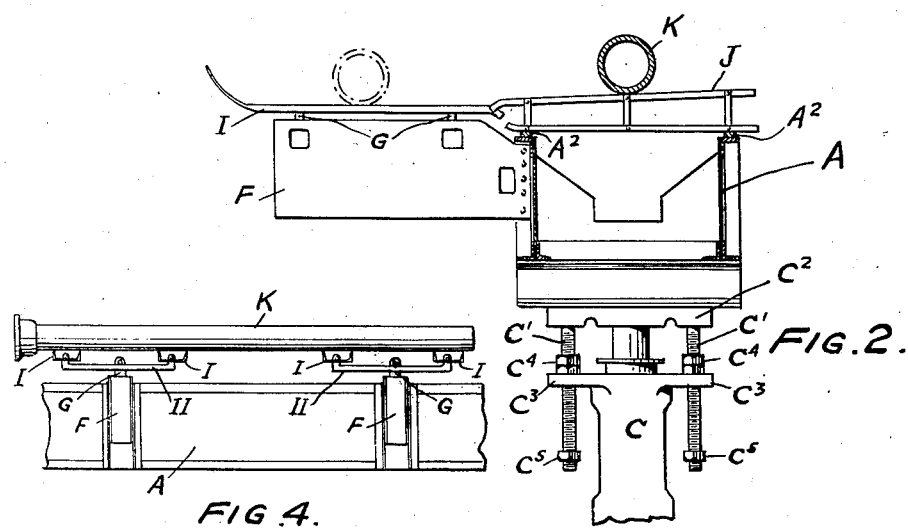
Figure 2 is a cross sectional elevation taken as on the line 2—2 of Fig. 1, showing also adjustable skids for receiving the pipes and a pipe resting on such skids.
Figure 3:
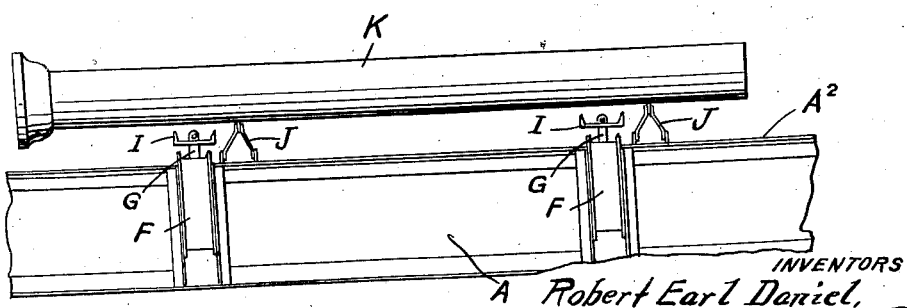
Figure 3 is a side elevation similar in general features to a portion of Fig. 1 but showing the adjustable pipe receiving skids in position and a pipe resting upon them.

J, J are adjustable skids which are placed by hand on the tracks A² to receive the pipes as they are withdrawn from the mold, the upper supporting edges of these skids being inclined so that when the pipe is free from the mold it can roll down on to the tracks or ledges I¹ of the pivoted frames I. K indicates a pipe, shown in Figs. 2, 3 and 4 as resting on the skids J, while in Fig. 2 a pipe is also shown as resting on the self adjustable skids supported by the lateral supporting frames.

In the modification shown in Fig. 4, the self adjusting skid frames I are shown as pivotally supported on the ends of a platform or frame I, I, which in turn is pivotally supported on the posts, as indicated at G.

In operation it will be seen that the runways supported on the laterally extending frames secured to the frame of the machine will always remain in fixed registry with the bed or frame of the machine no matter at what angle the bed may be adjusted. It will also be seen that by making the runway tracks vertically and angularly adjustable on the laterally extending supporting frame the level and inclination of these tracks can be adjusted at will and this is important where the same machine is used for the casting of pipes of different diameter. It will also be obvious that as soon as a pipe is shifted on to the runway or skid supported on the lateral frame that the weight of the pipe will cause the automatic adjustment of the tiltable frame pivotally supported on the laterally extending frame so that both of its supported ledges or tracks will be brought in contact with the pipe and maintained in contact with the pipe in spite of any variations in the contour of the pipe.

Having now described our invention, what we claim as new and desire to secure by Letters Patent, is:

1. A runway for pipes comprising one or more pivoted frames having runway tracks extending upward from the frames on opposite sides of their pivotal lines of support.

2. A runway for pipes comprising a plurality of pivoted frames each having runway tracks for pipes extending upward on each side of their pivotal lines of support.

3. A runway for pipes having the features of claim 1, in which the pivotal supports for the frames are vertically adjustable.

4. In a centrifugal pipe casting machine in which the casting apparatus is supported on a tiltable frame, having means for adjusting the angle of tilt, the improvement which consists in combining with said tilting frame rigid laterally extending supporting means and skid supports for pipes supported on said supporting means.

5. A centrifugal pipe casting machine having the features of claim 4, in which the pipe supporting means comprise one or more frames pivotally supported on the laterally extending supports, said frames having upwardly extending pipe supporting tracks located on each side of their lines of pivotal support.

6. A centrifugal pipe casting machine having the features of claim 4, a plurality of pivoted frames supported on the laterally extending supporting means and each provided with upwardly extending pipe supporting tracks located on each side of their lines of pivotal support.

7. A centrifugal pipe casting machine having the features of claim 4, vertically adjustable pivot supports supported by the laterally extending supporting means, the tiltable frames supported on said pivot supports, each having upwardly extending pipe supporting tracks located on opposite sides of their lines of pivotal support.

ROBERT EARL DANIEL.
RICHARD K. HAUGHTON.
STUART B. CLARK.